(12) United States Patent
Shimizu

(10) Patent No.: US 7,645,072 B2
(45) Date of Patent: Jan. 12, 2010

(54) ROLLING MACHINE ELEMENT

(75) Inventor: Shigeo Shimizu, Kawasaki (JP)

(73) Assignee: THK Co., Ltd., Tokyo (JP)

( * ) Notice: Subject to any disclaimer, the term of this patent is extended or adjusted under 35 U.S.C. 154(b) by 416 days.

(21) Appl. No.: 11/569,032

(22) PCT Filed: May 12, 2004

(86) PCT No.: PCT/JP2004/006383

§ 371 (c)(1),
(2), (4) Date: Nov. 13, 2006

(87) PCT Pub. No.: WO2005/108807

PCT Pub. Date: Nov. 17, 2005

(65) Prior Publication Data

US 2007/0211969 A1    Sep. 13, 2007

(51) Int. Cl.
*F16C 29/04* (2006.01)
(52) U.S. Cl. .......................... 384/44; 384/45
(58) Field of Classification Search ................ 384/13, 384/43–49, 51
See application file for complete search history.

(56) References Cited

U.S. PATENT DOCUMENTS

| 4,652,147 | A |   | 3/1987  | Geka              |        |
|-----------|---|---|---------|-------------------|--------|
| 5,248,202 | A | * | 9/1993  | Kawasugi et al.   | 384/45 |
| 5,385,406 | A | * | 1/1995  | Ichida et al.     | 384/45 |
| 5,593,003 | A |   | 1/1997  | Abe et al.        |        |
| 5,851,073 | A |   | 12/1998 | Takeuchi          |        |
| 6,390,679 | B1| * | 5/2002  | Kashiwagi         | 384/44 |
| 6,590,709 | B1|   | 7/2003  | Ori et al.        |        |
| 6,807,746 | B2|   | 10/2004 | Matsumoto         |        |

FOREIGN PATENT DOCUMENTS

| JP | 62-4922     | A | 1/1987 |
| JP | 01-126421   | A | 5/1989 |
| JP | 1-126421    | A | 5/1989 |
| JP | 03-43118    |   | 4/1991 |
| JP | 1991043118  | U | 4/1991 |

(Continued)

OTHER PUBLICATIONS

Notification of Transmittal of Translation of the International Preliminary Report on Patentability (Form PCT/IPEA/409) of International Application No. PCT/JP2004/006383 filed May 12, 2004.

(Continued)

*Primary Examiner*—Marcus Charles
(74) *Attorney, Agent, or Firm*—Westerman, Hattori, Daniels & Adrian, LLP

(57) ABSTRACT

The rolling machine element includes a first member in which a raceway surface is formed and a second member on which the first member is mounted through the rolling elements and which is formed to be able to guide the first member in a specified direction. The rolling machine element is characterized in that the first member can be moved in the guiding direction of the second member by allowing the rolling elements to move in an out of the raceway surface in an orderly arranged state, and the crowning based on the oval shape is formed at the end part of the raceway surface of the first member where an access point for the rolling elements is formed.

4 Claims, 10 Drawing Sheets

FOREIGN PATENT DOCUMENTS

| | | |
|---|---|---|
| JP | 08-200363 A | 8/1996 |
| JP | 8-200363 A | 8/1996 |
| JP | 8-320019 A | 12/1996 |
| JP | 08-320019 A | 12/1996 |
| JP | 10-37955 A | 2/1998 |
| JP | 10-293205 A | 11/1998 |
| JP | 2001-140902 A | 5/2001 |
| JP | 2001-173718 A | 6/2001 |
| JP | 2001-271835 A | 10/2001 |
| JP | 2003-322150 A | 11/2003 |
| JP | 2004-019728 A | 1/2004 |
| JP | 2004-19728 A | 1/2006 |

OTHER PUBLICATIONS

International Search Report of PCT/JP2004/006383, date of mailing Aug. 24, 2004.

Shigeo Shimizu "Study on Accuracy Average Effect on Linear Motion Ball Guides System", Journal of Japanese Society for Precision Engineering, Nov. 1992, p. 85-91.

Shigeo Shimizu "On Load Rating of a Linear Motion Ball Bearing"Journal of Japanese Society of Tribologists, Nov. 1999, p. 19-22.

Shigeo Shimizu "Dynamic Capacity of Linear Motion Rolling Guide Elements", Kosaido Co., Ltd., Feb. 1999, p. 1-47.

Shigeo Shimizu "Load Distribution and Accuracy • Rigidity of Linear Motion Ball Guides System", JSPE-56-08 '90-08-1445, p. 84-91, vol. 56, No. 8.

Shigeo Shimizu "Load Distribution and Accuracy • Rigidity of Linear Motion Ball Guides System", JSPE-57-10 '91-10-1814, p. 112-117, vol. 57, No. 10.

International Preliminary Report (PCT/IPEA/409) received Sep. 6, 2006, of International Application No. PCT/JP2004/006383.

Notification of Reason for Refusal dated Oct. 14, 2008 issued in corresponding Japanese Application No. 2002-336957.

* cited by examiner

ROLLING MACHINE ELEMENT

TECHNICAL FIELD

The present invention relates to rolling machine elements, such as ball guides, roller guides, ball splines and ball bushes, and in particular, to a rolling machine element whose loading capacity, rigidity and accuracy are remarkably increased by forming a crowning based on an oval shape at an end part of a raceway surface of a guide block (ball guide, roller guide, etc.) or an outer tube (ball spline, ball bush, etc.) to make large load act on rolling members even near the end of the crowning.

TECHNICAL BACKGROUND

As shown in FIG. 9, a ball guide 1 is formed to allow a guide block 2 to be movable on a rail 3 in a direction indicated by an arrow A or B. In the guide block 2, a large number of balls 4, which is one example of rolling members, are rolled and circulated in an orderly arranged state. During the rolling and circulation, balls 4 residing within a range of a raceway surface length $l_t$ are made to come into contact with a raceway surface 3a of the rail 3 and a raceway surface 2a of the guide block 2 so as to sustain load applied to the guide block 2 from outside.

Roller guides, ball splines, ball bushes and others are also formed to allow rolling members to be rolled and circulated, while there are some elements, such as ball slides and cross roller guides, which do not allow rolling members to circulate therein.

In any of these elements, how a crowning is imparted to both end parts of the raceway surface is so important a factor as to determine all performances including accuracy in running and duration of life (refer to "Study on Accuracy Average Effect on Linear Motion Ball Guides System" by Shigeo SHIMIZU, Journal of Japan Society for Precision Engineering, November 1992).

However, as shown in FIG. 10, a conventional crowning 2b has a crowning length $X_r$ (a length from a crowning start point "o" to a crowning end "a") and a crowning relief amount $\lambda_e$, and is based on a circular arc 5 whose radius R is decided to make the arc abut on a raceway surface 2a at the crowning start point "o". The radius R is expressed by a mathematical expression 1 and the circular arc 5 is expressed by a mathematical expression 2.

$$R = \frac{X_r^2 + \lambda_e^2}{2\lambda_e} \qquad \text{[mathematical expression 1]}$$

$$x^2 + (y - R)^2 = R^2 \qquad \text{[mathematical expression 2]}$$

The formation of the circular arc 5 faithfully on the expression results in an increase in manufacturing costs. Hence, the circular arc has been actually formed as shown in FIG. 11 wherein, with the circular arc 5 as a base, an edge ranging from the crowning start point "o" to the point "a" decided by the crowning relief amount $\lambda_e$ at the crowning end 2c is chamfered linearly, or as shown in FIG. 12 wherein an edge starting from the crowning start point "o" is formed into a polygonal shape whose apexes are points "d", "c", "b" and "a" on the circular arc 5.

As shown in FIG. 10, however, in the case of the circular-arc crowning, a crowning relief amount $\lambda_x$, which depends on a distance "x" starting from the crowning start point "o", becomes large while the distance "x" is still small. As a result, it has been that a ratio of load (load factor) sustained by the balls 4 positioned on the flat raceway surface 2a to load sustained by the balls 4 residing in the range of the crowning length $X_r$, becomes lower.

Additionally, please see "On load rating of a linear motion ball bearing" by Shigeo SHIMIZU, Journal of Japanese Society of Tribologists, November 1999, and "Dynamic capacity of a linear motion rolling guide element" by Shigeo SHIMIZU, Kosaido Co., Ltd., February 1999.

DISCLOSURE OF THE INVENTION

Problem to be Solved by the Invention

The present invention has been made in order to remove the drawbacks of the conventional art provided above, and has as its object to provide a rolling machine element which is provided with a first member formed with a raceway surface along which rolling members roll under a load, and a second member to which the first member is attached through the rolling members to enable guiding of the first member to a predetermined direction, and which is so arranged that the rolling members are allowed to move in and out of the raceway surface in an orderly arranged state to allow the first member to move in the guiding direction of the second member, wherein a crowning of oval shape is formed at an end part of the raceway surface of the first member, the end part being an access point for the rolling members, so that a load factor of the rolling members positioned in the range of the crowning is improved to enhance loading capacity, rigidity and accuracy of the rolling machine element.

Another object is to form, in the arrangement provided above, a crowning of oval shape with ½ of a short axis decided by a predetermined crowning relief amount at an end part of a raceway surface of a first member, the end part being the access point for the rolling members, so that loading of the rolling members working on the rolling members positioned at the end part of the crowning becomes exactly "0" when a maximum radial load defined such as by standards or specifications has been applied, and to enable smooth movement of the rolling members in and out of a loading area of the raceway surface, while maintaining a load factor of the rolling members at a high level.

Still another object is to form, in the arrangement provided above, a polygonal crowning based on an oval shape with ½ of a short axis decided by a predetermined crowning relief amount and having a plurality of points as apexes, at an end part of a raceway surface of a first member, so that processing of a crowning is facilitated to reduce manufacturing costs of a rolling machine element with enhanced loading capacity, rigidity and accuracy.

Means for Solving the Problem

Briefly, the present invention is to provide a rolling machine element which is provided with a first member formed with a raceway surface along which rolling members roll under a load, and a second member to which the first member is attached through the rolling members to enable guiding of the first member to a predetermined direction, and which is so arranged that the rolling members are allowed to move in and out of the raceway surface in an orderly arranged state to allow the first member to move in the guiding direction of the second member, characterized in that a crowning of oval shape (except for circular-arc shape) is formed at an end part of the raceway surface of the first member, the end part serving as an access point for the rolling members.

The present invention is to provide a rolling machine element which is provided with a first member formed with a raceway surface along which rolling members roll under a load, and a second member to which the first member is attached through the rolling members to enable guiding of the first member to a predetermined direction, and which is so arranged that the rolling members are allowed to move in and out of the raceway surface in an orderly arranged state to allow the first member to move in the guiding direction of the second member, characterized in that a crowning of oval shape (except for circular-arc shape) with ½ of a short axis decided by a predetermined crowning relief amount is formed at an end part of the raceway surface of the first member, the end part serving as an access point for the rolling members.

The present invention is to provide a rolling machine element which is provided with a first member formed with a raceway surface along which rolling members roll under a load, and a second member to which the first member is attached through the rolling members to enable guiding of the first member to a predetermined direction, and which is so arranged that the rolling members are allowed to move in and out of the raceway surface in an orderly arranged state to allow the first member to move in the guiding direction of the second member, characterized in that a polygonal crowning based on an oval shape (except for a circular-arc shape) with ½ of a short axis decided by a predetermined crowning relief amount, having a plurality of points as apexes and guiding the rolling members to roll under the load is formed at an end part of the raceway surface of the first member, the end part serving as an access point for the rolling members.

The present invention is to provide a rolling machine element which is provided with a first member formed with a raceway surface along which rolling members roll under a load, and a second member to which the first member is attached through the rolling members to enable guiding of the first member to a predetermined direction, and which is so arranged that the rolling members are allowed to move in and out of the raceway surface in an orderly arranged state to allow the first member to move in the guiding direction of the second member, characterized in that a polygonal crowning based on an oval shape (except for a circular-arc shape), having a plurality of points as apexes and guiding the rolling members to roll under the load is formed at an end part of the raceway surface of the first member, the end part serving as an access point for the rolling members.

EFFECT OF THE INVENTION

In a rolling machine element which is provided with a first member formed with a raceway surface, and a second member to which the first member is attached through rolling members to enable guiding of the first member to a predetermined direction, and which is so arranged that the rolling members are allowed to move in and out of the raceway surface in an orderly arranged state to allow the first member to move in the guiding direction of the second member, a crowning of oval shape is formed at an end part of the raceway surface of the first member, the end part serving as an access point for the rolling members. Thus, the present invention can enhance a load factor of the rolling members positioned within a range of the crowning, whereby providing an advantage of enhancing loading capacity, rigidity and accuracy of the rolling machine element.

In the arrangement provided above, a crowning of oval shave with a short axis decided by a predetermined crowning relief amount is formed at an end part of the raceway surface of the first member, the end part serving as an access point for the rolling members. Accordingly, the present invention provides an advantage of allowing the loading of the rolling members working on the rolling members positioned at the end of the crowning to be exactly "0" when a maximum radial load defined such as by standards or specifications has been applied. Also, smooth movement of the rolling members in and out of a loading area of the raceway surface is ensured, while maintaining a load factor of the rolling members at a high level.

Further, in the arrangement provided above, a polygonal crowning based on an oval shape with ½ of a short axis decided by a predetermined crowning relief amount and having a plurality of points as apexes is formed at the end part of the raceway surface of the first member. Thus, the present invention may provide an advantage of facilitating processing of the crowning to reduce manufacturing costs of the rolling machine element with enhanced loading capacity, rigidity and accuracy.

PREFERRED EMBODIMENTS OF THE INVENTION

The present invention is hereinafter described based on some embodiments shown in the drawings. A rolling machine element 10 according to a first embodiment of the present invention is a ball guide, for example, as shown in FIG. 1, which is provided with a guide block 11, an example of a first member, formed with a raceway surface 14, and provided with a rail 12, an example of a second member, to which the guide block 11 is attached through balls 13, an example of rolling members, to enable guiding of the guide block 11 in a predetermined direction, and which is so arranged that the balls 13 move in and out of the raceway surface 14 of the guide block 11 in an orderly arranged state to allow the guide block 11 to move in the guiding direction of the rail 12. In the rolling machine element 10, a crowning 14a based on an oval shape 15 with a short axis decided by a predetermined crowning relief amount $\lambda_e$, is formed at an end part, or an access point for the balls 13, of the raceway surface 14 of the guide block 11.

With a crowning start point "o" as an origin, a direction along the raceway surface 14 as an x-axis, and a direction along a height of the guide block 11 as a y-axis, an equation of the oval shape 15 is expressed by the following mathematical expression 3:

$$\left(\frac{x}{X_r}\right)^2 + \left(\frac{y}{\lambda_e}\right)^2 = 1, \qquad \text{[mathematical expression 3]}$$

where $X_r$ is ½ of a long axis (crowning relief width) and $\lambda_e$ is ½ of a short axis (crowning relief amount).

When a length of the crowning relief width $X_r$, which may be set at any value, is extended to substantially a center of the raceway surface 14, substantially all range of a raceway length $l_t$ is in a state of crowning, which is a so-called full-crowning state. Therefore, it is considered that rigidity and life duration are deteriorated but that guiding accuracy is remarkably improved and abrasion resistance is dramatically reduced.

For comparison with the conventional circular-arc crowning, a circular arc 16 of a radius R connecting the crowning start point "o" and a crowning end "a" is indicated in FIG. 1. However, comparing the crowning 14a based on the oval shape 15 with the circular arc 16, the positions of the crowning start point "o" and the crowning end "a" are common, but the crowning 14a is more largely arched toward the direction of the origin of the y-axis. This largely arched portion ensures improvement in the load factor of the balls 13.

A rolling machine element 20 according to a second embodiment of the present invention is a ball guide, for example, as shown in FIGS. 2 to 4, which is provided with a guide block 21, an example of a first member, formed with a raceway surface 24, and provided with a rail 22, an example of a second member, to which the guide block 21 is attached through balls 13, an example of rolling members, to enable guiding of the guide block 21 in a predetermined direction, and which is so arranged that the balls 13 move in and out of the raceway surface 24 of the guide block 21 in an orderly arranged state to allow the guide block 21 to move in the guiding direction of the rail 22. In the rolling machine element 20, a crowning 24a of a polygonal shape is formed at an end part, or an access point for the balls 13, of the raceway surface 24 of the guide block 21, the polygonal shape being based on an oval shape 15 with ½ of a short axis decided by a predetermined crowning relief amount $\lambda_e$ and having a plurality of points a, b, c and o as apexes.

The oval shape 15, which is the base of the crowning 24, is similar to the first embodiment of the present invention. The apexes are not limited to the four points a, b, c and o, but may more or less than this number.

Since the rolling machine element 20 is a ball guide, for example, an end plate 25 is attached to both ends of the guide block 11, as shown in FIG. 4. By allowing the balls 13 to pass through the end plates 25, the balls 13 are adapted to roll and circulate through the guide block 11.

The present invention is arranged as described above. Hereinafter are described the effects of the present invention. The explanation provided below is on the effects of the guide block 21 in the rolling machine element 20 according to the second embodiment of the present invention. As shown in FIG. 4, the balls 13 are interposed between the guide block 21 and the rail 22, so that the guide block 21 can be freely moved with respect to the fixed rail 22 in the guiding direction, or a direction indicated by an arrow C or an arrow D, of the rail 22. At this time, the balls 13 roll and circulate in the guide block 21 in a direction indicated by an arrow G or an arrow H.

In case a radial load F which is ½ of a basic dynamic load rating works on the guide block 21, a deformation amount equivalent to the crowning relief amount $\lambda_e$ is caused between the raceway surface 24, the balls 13 and the rail 22, as far as the raceway surface 24 other than the crowning 24a is concerned.

Once the balls 13 move on in the direction of the arrow H and enter the area of the crowning 24a, as the balls 13 come closer to an end of the crowning, the ball loading is reduced. By the time the balls 13 have reached an end of the crowning, the ball loading has been reduced to exactly "0", and then, the balls 13 keep moving on in the direction of the arrow H. The reason why the ball loading becomes exactly "0" at the crowning end is that the guide block 11 descends by the crowning relief amount $\lambda_e$ due to the radial load F and that a gap between the raceway surface 24 and the rail 22 at the crowning end becomes equal to a diameter of each of the balls.

Contrarily, once the balls 13 move on in the direction of the arrow G and have reached the crowning end, the ball loading is "0" which, however, increases as the balls 13 further advance, and becomes maximum at the crowning start point. The balls 13 then keep further rolling along the raceway surface 24. At this time, a deformation amount between the raceway surface 24, the balls 13 and the rail 22 is equal to the crowning relief amount $\lambda_e$.

A life duration formula defined by the International Organization for Standardization (ISO) is applied under a radial load of equal to or less than ½ of a basic dynamic load rating which is also determined by a formula agreed upon by the ISO.

Accordingly, by providing the crowning relief amount $\lambda_e$ equivalent to a deformation amount of the balls under the radial load which is ½ of the basic dynamic load rating, the entire raceway surface 24 including the crowning 24a is brought into contact with the balls 13 even when the radial load is working on to thereby obtain a sufficient loading capacity. Further, since the gap between the raceway surface 24 and the rail 22 at the crowning end becomes equal to the diameter of each of the balls 13, the balls 13 can smoothly move in or out of the raceway surface 24.

Table 1 indicates examples of calculation in case the crowning of the ball guide is a circular-arc crowning, a parabolic crowning and an oval crowning. The calculation has been carried out with the following requirements: ball diameter $D_w$=6.35 mm, crowning relief amount $\lambda_e$=0.023228 mm, pertinency factor f (=raceway surface radius R/ball diameter $D_w$)=0.52, and radius R=867.983 mm of a circle of the circular-arc crowning, and on the assumption that the radial load F which is ½ of a basic dynamic load rating C works on.

TABLE 1

| | circular-arc/parabolic crowning | | oval crowning | |
|---|---|---|---|---|
| $x/X_r$ | $\lambda_x$ mm | $(1 - \lambda_x/\lambda_e)^{1.5}$ | $\lambda_x$ mm | $(1 - \lambda_x/\lambda_e)^{1.5}$ |
| 0.000 | 0.000 | 1.000 | 0.000 | 1.000 |
| 0.100 | 0.232 | 0.985 | 0.116 | 0.992 |
| 0.200 | 0.929 | 0.941 | 0.469 | 0.970 |
| 0.300 | 2.090 | 0.868 | 1.070 | 0.932 |
| 0.400 | 3.716 | 0.770 | 1.939 | 0.877 |
| 0.500 | 5.807 | 0.650 | 3.112 | 0.806 |
| 0.600 | 8.362 | 0.512 | 4.646 | 0.716 |
| 0.700 | 11.382 | 0.364 | 6.640 | 0.604 |
| 0.800 | 14.866 | 0.216 | 9.291 | 0.465 |
| 0.850 | 16.782 | 0.146 | 10.992 | 0.382 |
| 0.900 | 18.815 | 0.083 | 13.103 | 0.288 |
| 0.950 | 20.963 | 0.030 | 15.975 | 0.174 |
| 0.975 | 22.081 | 0.011 | 18.067 | 0.105 |
| 0.990 | 22.766 | 0.003 | 19.951 | 0.053 |
| 1.000 | 23.228 | 0.000 | 23.228 | 0.000 |

In Table 1, the first column indicates a ratio of a distance in the direction of the x-axis from the crowning start point "o" to ½ of the long axis $X_r$ (crowning width) of the oval shape 15 indicated in FIG. 1, i.e. a dimensionless quantity. The second and the third columns indicate cases of the circular-arc crowning and the parabolic crowning of the conventional art, and the fourth and the fifth columns indicate cases of the oval crowning of the present invention. The second and the fourth columns indicate a distance $\lambda_x$ in the direction of the y-axis from the crowning start point "o", and the third and the fifth columns indicate a load factor $(1-(1-\lambda_x/\lambda_e)^{1.5})$ of the balls. The circular-arc crowning and the parabolic crowning each being a quadratic expression, match in the distance $\lambda_x$ within a range of significant digits and also match in the load factor, and thus are indicated in the same columns.

The load factor is a ratio of a ball loading when the balls are positioned at the crowning portion to a ball loading when the balls are positioned at the raceway surface other than the crowning portion. Specifically, the ball loading at the crowning start point "o" is "1" and at the crowning end "a" is "0", the load factor resulting in "0".

As can be seen from Table 1, when the crowning width $x/X_r=0.5$, the load factor of the oval crowning is 80.6%, which is higher than the load factor 65% of the circular-arc crowning and the parabolic crowning. This is comparatively indicated in the diagrams of FIG. 5.

Indicated by (1) is the case of the circular-arc crowning, and by (2) is the case of the oval crowning. The lower diagram whose vertical axis indicating the distance $\lambda_x$ shows the shapes of the crownings as they are. It can be seen that the oval crowning is more largely arched downward by the hatched area than the circular-arc crowning.

Also, as can be seen from the upper diagram whose vertical axis indicating the load factor, the load factor of the oval crowning is higher by the hatched area than that of the circular-arc crowning.

In the diagrams shown in FIG. 6, the horizontal axes show the pertinency factor, while the vertical axes indicating the basic dynamic load rating C, a ball loading $Q_c$ when the radial load which is ½ of the basic dynamic load rating C works on, the crowning relief amount $\lambda_e$, a deformation amount $\delta_{Qc}$ when the ball loading $Q_c$ works on, a maximum Hertzian stress $\sigma_{max}$, and a ball diameter $D_w$/crowning relief amount $\lambda_e$. The requirements for calculation are: raceway surface length $l_r=72$ mm, ball diameter $D_w=6.35$ mm, number of rows of the balls $i_r=2$ rows, and contact angle $\alpha=45°$. The contact angle $\alpha=45°$ implies that the balls and the raceway surface abut with each other being inclined by 45° with respect to the direction on which the radial load works on.

As can be seen from the lowermost diagram of FIG. 6, the ratio of the ball diameter $D_w$ and the crowning relief amount $\lambda_e$ varies from 270 to 290 with respect to the variation of the pertinency factor f=0.51 to 0.55.

Table 2 shows some examples of calculation associated with the crownings in case the rolling machine element 10 is a roller guide. The calculation has been carried out under the following requirements: a roller diameter $D_w=6.35$ mm, a roller length $L_w=6.35$ mm, the crowning relief amount $\lambda_e=0.016829$ mm, a roller effective length factor $f_L=0.7$ (=roller effective length $L_{we}$/roller length $L_w$), and a radius R=1198.015 mm of a circle in the circular-arc crowning, and on the assumption that a radial load F which is ½ of the basic dynamic load rating C works on.

TABLE 2

| | circular-arc/parabolic crowning | | oval crowning | |
|---|---|---|---|---|
| $x/X_r$ | $\lambda_x$ mm | $(1-\lambda_x/\lambda_e)^{10/9}$ | $\lambda_x$ mm | $(1-\lambda_x/\lambda_e)^{10/9}$ |
| 0.000 | 0.000 | 1.000 | 0.000 | 1.000 |
| 0.100 | 0.168 | 0.989 | 0.084 | 0.994 |
| 0.200 | 0.673 | 0.956 | 0.340 | 0.978 |
| 0.300 | 1.515 | 0.901 | 0.775 | 0.949 |
| 0.400 | 2.693 | 0.824 | 1.405 | 0.908 |
| 0.500 | 4.207 | 0.726 | 2.255 | 0.852 |
| 0.600 | 6.058 | 0.609 | 3.366 | 0.780 |
| 0.700 | 8.246 | 0.473 | 4.811 | 0.688 |
| 0.800 | 10.771 | 0.321 | 6.732 | 0.567 |
| 0.850 | 12.159 | 0.241 | 7.964 | 0.491 |
| 0.900 | 13.631 | 0.158 | 9.493 | 0.397 |
| 0.950 | 15.188 | 0.075 | 11.574 | 0.274 |
| 0.975 | 15.998 | 0.035 | 13.090 | 0.188 |
| 0.990 | 16.494 | 0.013 | 14.455 | 0.113 |
| 1.000 | 16.829 | 0.000 | 16.829 | 0.000 |

In Table 2, each of the columns indicates the same items as in Table 1. As can be seen from Table 2, when the crowning width $x/X_r=0.5$, the load factor of the oval crowning is 85.2%, which is again higher than 72.6% of the circular-arc crowning and the parabolic crowning. This is comparatively indicated in the diagrams of FIG. 7.

As in FIG. 5, indicated by (1) is the case of the circular-arc crowning, and by (2) is the case of the oval crowning. The lower diagram whose vertical axis indicating the distance $\lambda_x$ shows the shapes of the crownings as they are. It can be seen that the oval crowning is more largely arched downward by the hatched area than the circular-arc crowning.

Also, as can be seen from the upper diagram whose vertical axis indicating the load factor, the load factor of the oval crowning is higher by the hatched area than that of the circular-arc crowning.

In the diagrams shown in FIG. 8, the horizontal axes show a roller effective length factor $f_L$, while the vertical axes indicating the basic dynamic load rating C, a ball loading $Q_c$ when the radial load which is ½ of the basic dynamic load rating C works on, the crowning relief amount $\lambda_e$, a deformation amount $\delta_{Qc}$ when the ball loading $Q_c$ works on, a maximum Hertzian stress $\sigma_{max}$, and a ball diameter $D_w$/crowning relief amount $\lambda_e$. The requirements for calculation are: raceway surface length $l_r=72$ mm, roller diameter $D_w=6.35$ mm, number of rows of the balls $i_r=2$ rows, and contact angle $\alpha=45°$.

As can be seen from the lowermost diagram of FIG. 6, the ratio of the ball diameter $D_w$ and the crowning relief amount $\lambda_e$ varies from 330 to 460 with respect to the variation of the roller effective length factor $f_L=0.6$ to 0.9.

In the embodiments provided above, the roller machine elements 10 and 20 have each been described as a ball guide. However, the present invention is not limited to this, but the roller machine element may, for example, be a roller guide, a ball spline and a ball bush. The guiding by a rail or a shaft is not limited to a direction along a linear line, but may be along a curved line provided by a curved rail such as an R guide.

The rolling members are not limited to balls but may be any roller, such as a cylindrical roller, a needle roller, a barrel roller or a conical roller. In addition, the rolling members are not limited to those which are rolled and circulated in a guide block or an outer cylinder, but may be ones which are rotatably attached such as to a rail or a retainer, e.g. a cross roller guide or a ball slide.

Where the roller members are arranged to abut on the guide block and the rail at a certain contact angle, the crowning relief amount $\lambda_e$ may be determined according to an elastic deformation amount of the roller members in the direction of the contact angle.

BRIEF DESCRIPTION OF THE DRAWINGS

FIG. 2 is a partial longitudinal sectional view showing an enlarged crowning portion of the rolling machine element shown in FIG. 2, in which FIGS. 2 to 4 show a second embodiment of the present invention;

FIG. 3 is a side view showing the rolling element, which indicates a crowning at both ends of a raceway surface of a guide block, balls and a rail, as well as a state illustrated in an exaggerated manner where the guide block has come down due to the deformation of the balls, which is ascribed to radial load that has worked on the guide block;

FIG. 4 is a partial longitudinal sectional view showing a state where the balls move on the rail, rolling and circulating in the guide block under the radial load;

FIG. 9 is a longitudinal sectional view showing a ball guide, in which FIGS. 9 to 12 show conventional examples;

FIG. 10 is a partial longitudinal sectional view showing an enlarged shape and mathematical expressions associated with a circular-arc crowning;

FIG. 11 is a longitudinal sectional view showing a crowning based on a circular arc formed by linearly chamfering between a crowning start point and a crowning end; and FIG. 12 is a longitudinal sectional view showing a polygonal crowning based on a circular arc formed by sequentially connecting a plurality of points on a circular arc between a crowning start point and a crowning end.

Figure 1:
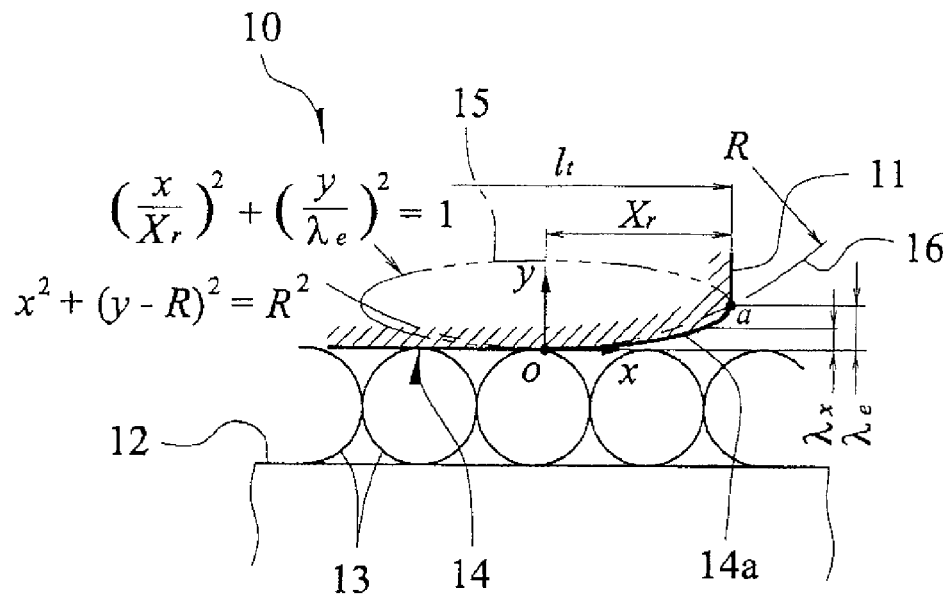
FIG. 1 is a partial longitudinal sectional view showing the shape and mathematical expressions associated with an oval crowning in a rolling machine element according to a first embodiment of the present invention.
Figure 2:
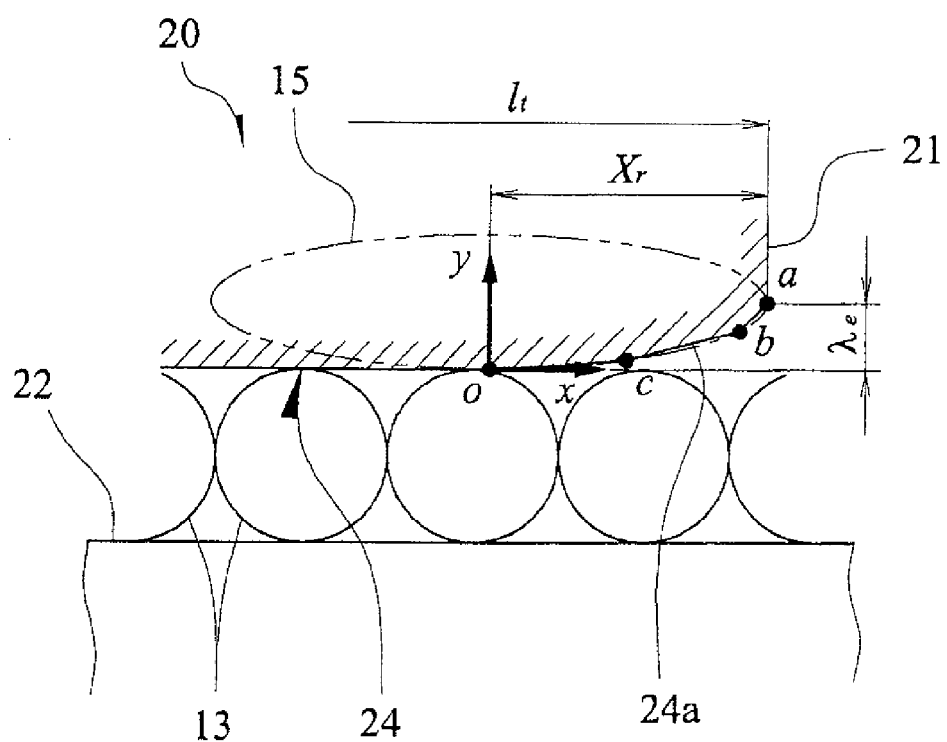
Figure 3:
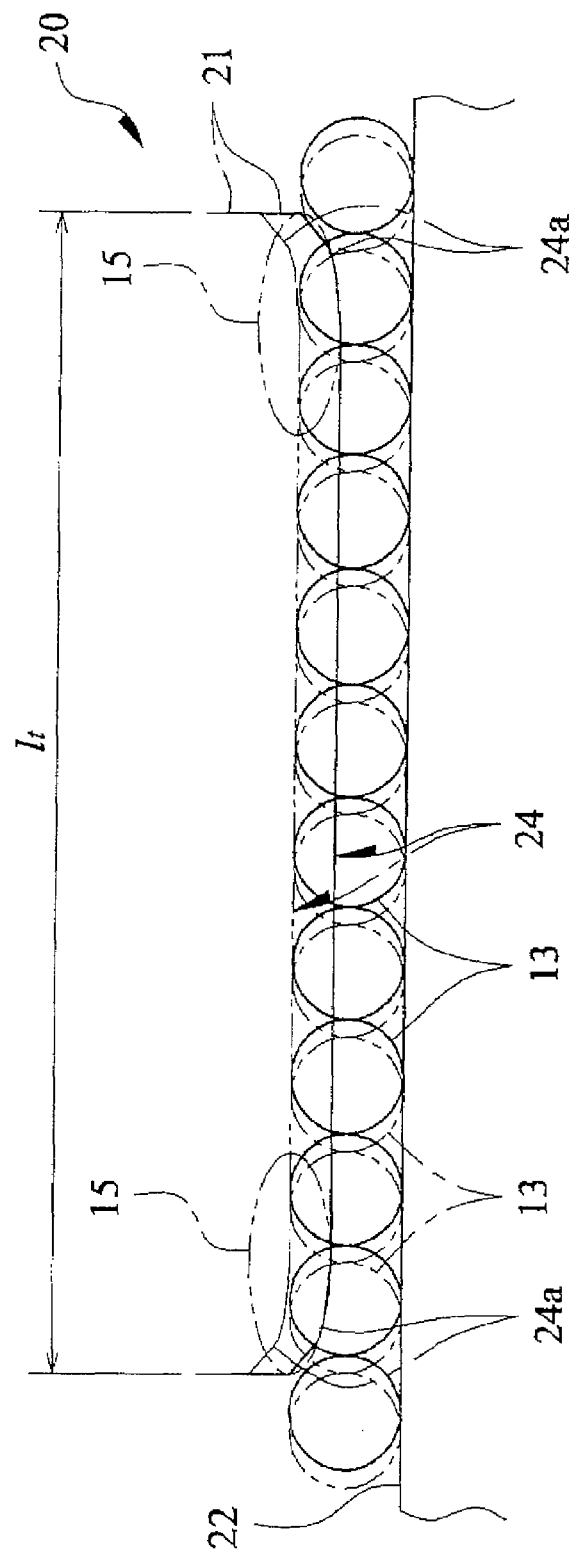
Figure 4:
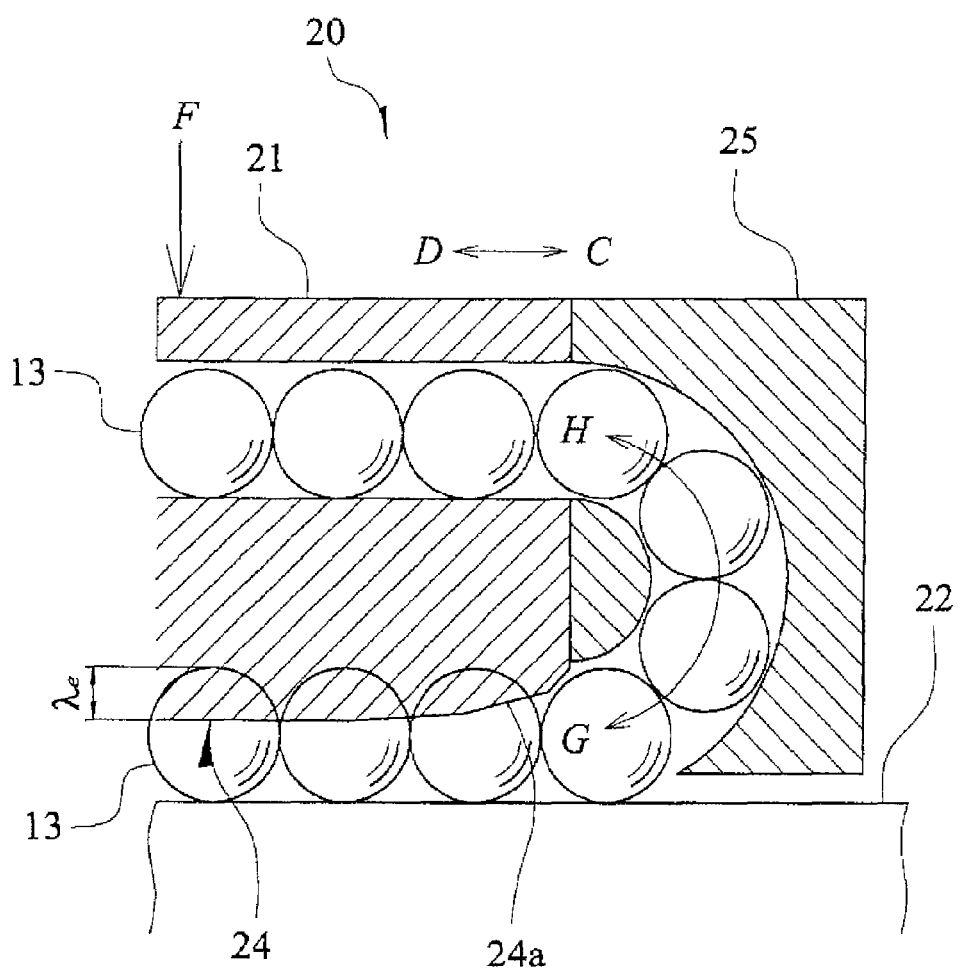
Figure 5:
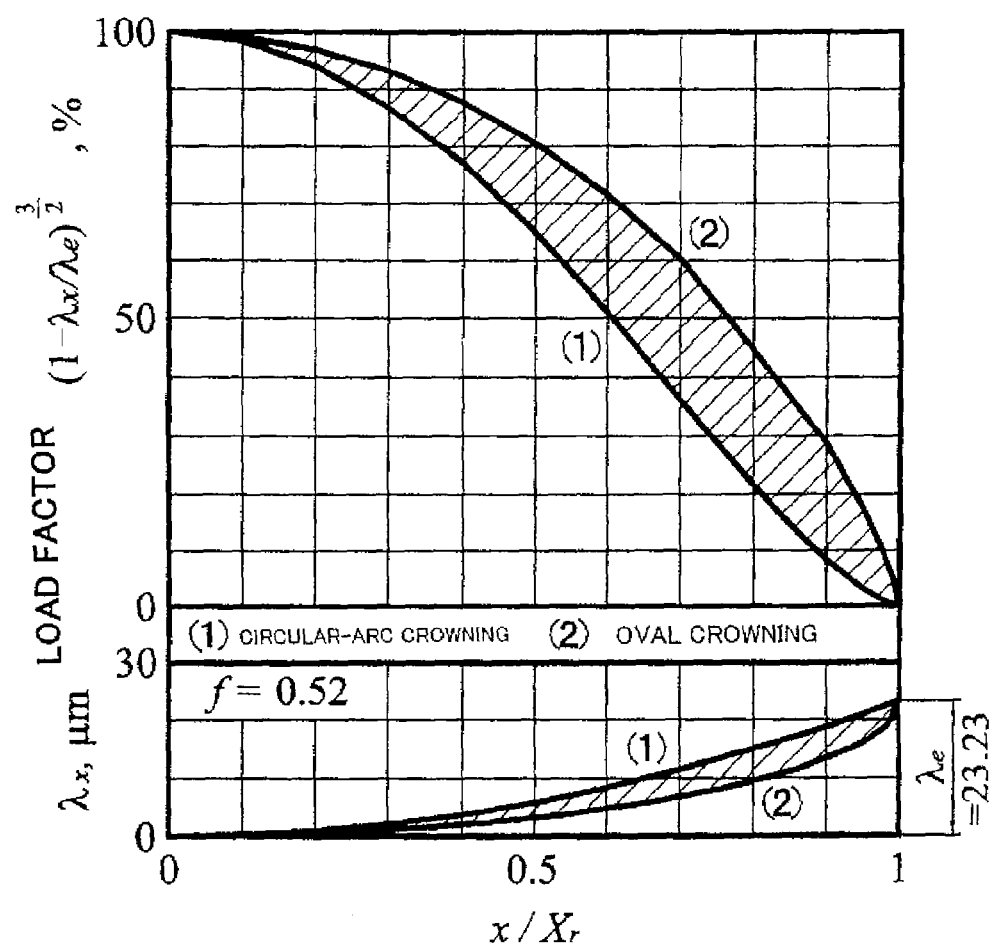
FIG. 5 illustrates diagrams showing results of calculation of crowning shapes and load factors of a ball guide.
Figure 6:
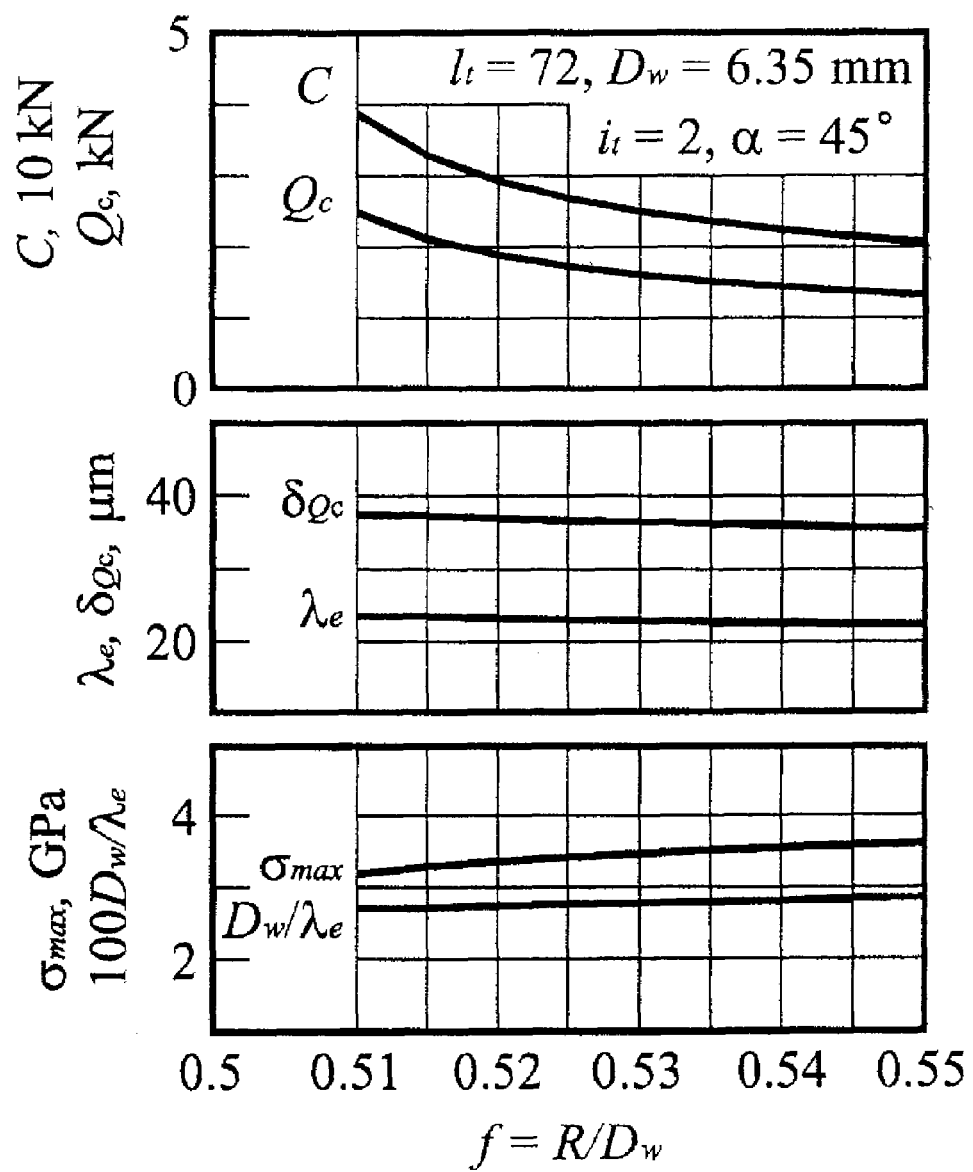
FIG. 6 illustrates diagrams showing a pertinency factor, as well as a basic dynamic load rating, a ball loading, a crowning relief amount, a ball deformation amount, a maximum Hertzian stress, and a ratio of a ball diameter to a crowning relief amount of the ball guide.
Figure 7:
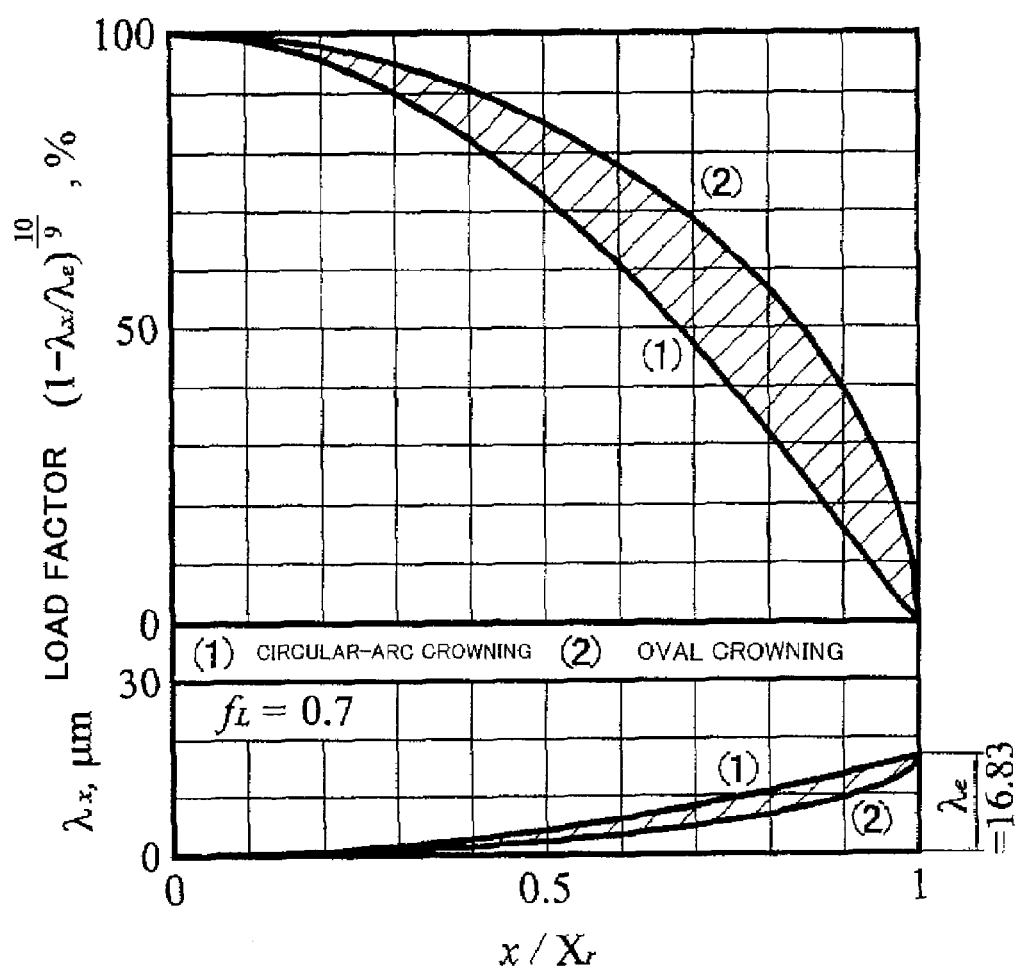
FIG. 7 illustrates diagrams showing results of calculation of crowning shapes and load factors of a roller guide.
Figure 8:
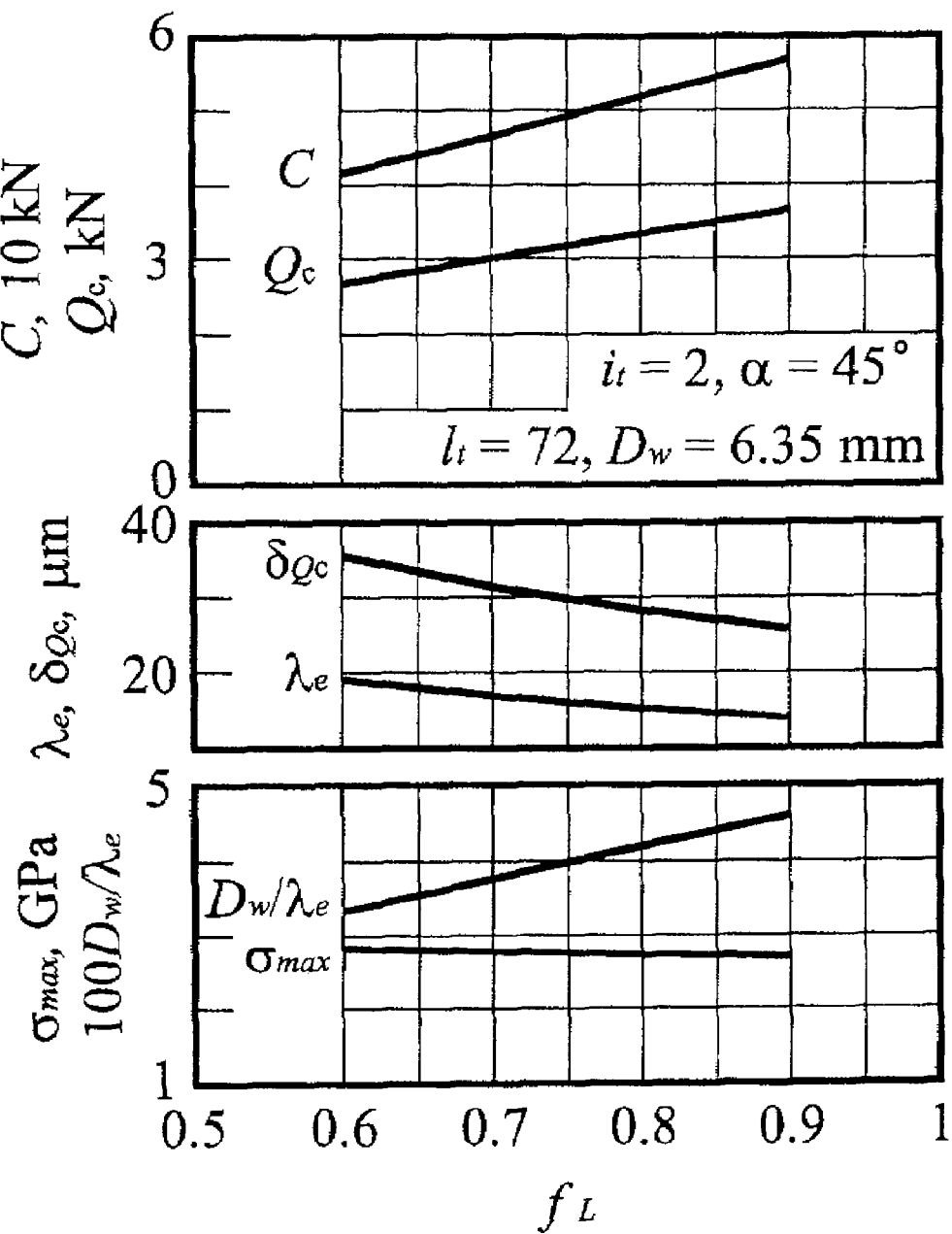
FIG. 8 illustrates diagrams showing a pertinency factor, as well as a basic dynamic load rating, a ball loading, a crowning relief amount, a ball deformation amount, a maximum Hertzian stress, and a ratio of a ball diameter to a crowning relief amount of the roller guide.
Figure 9:
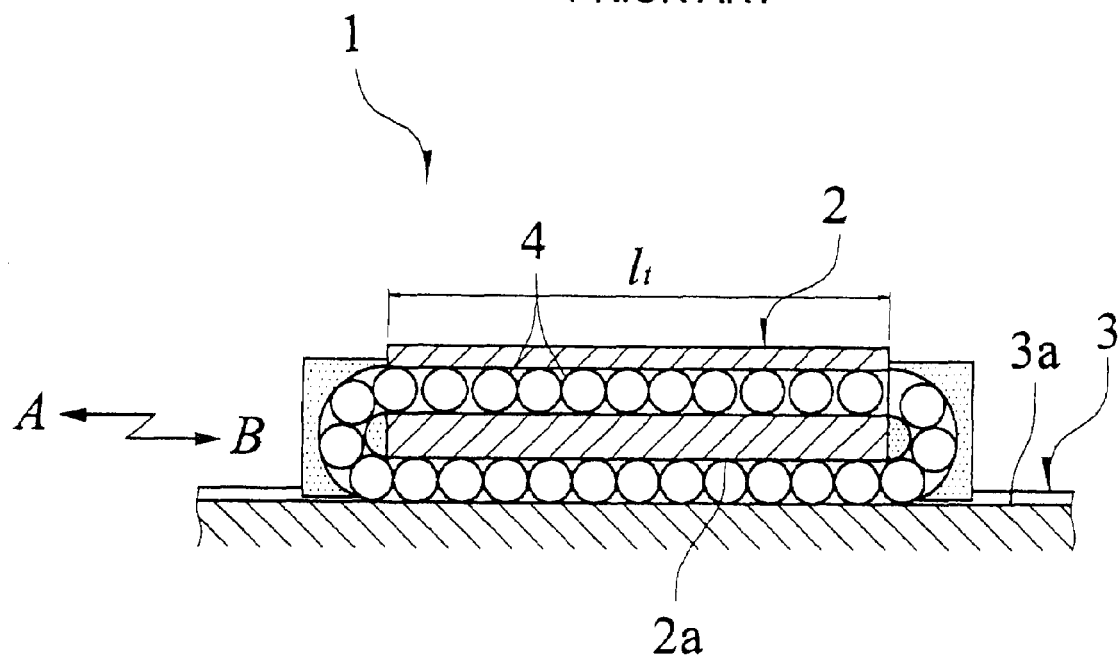
Figure 10:
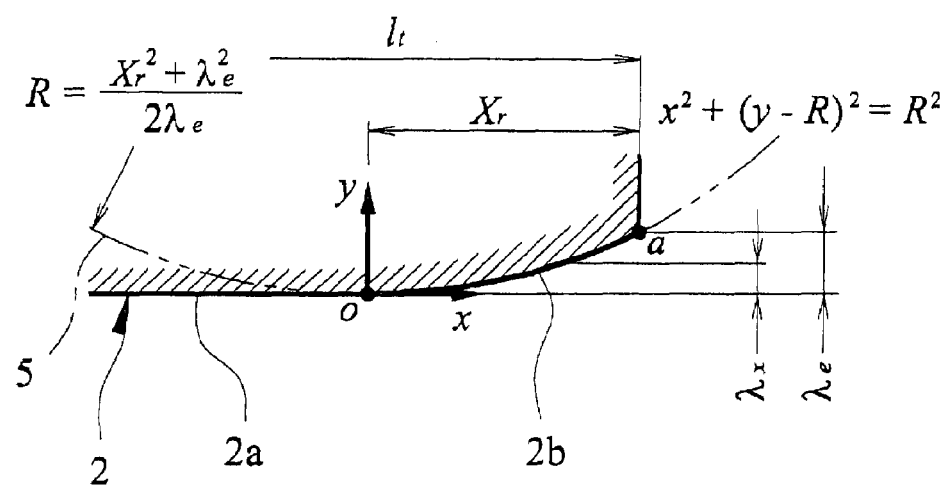
Figure 11:
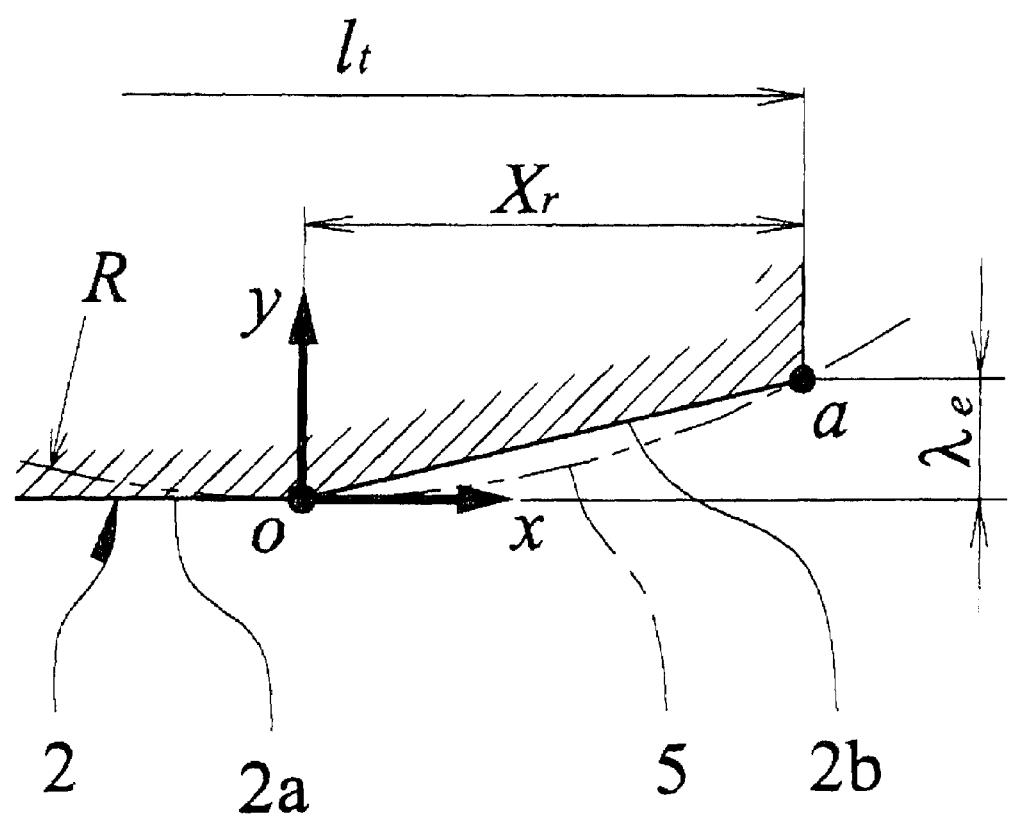
Figure 12:
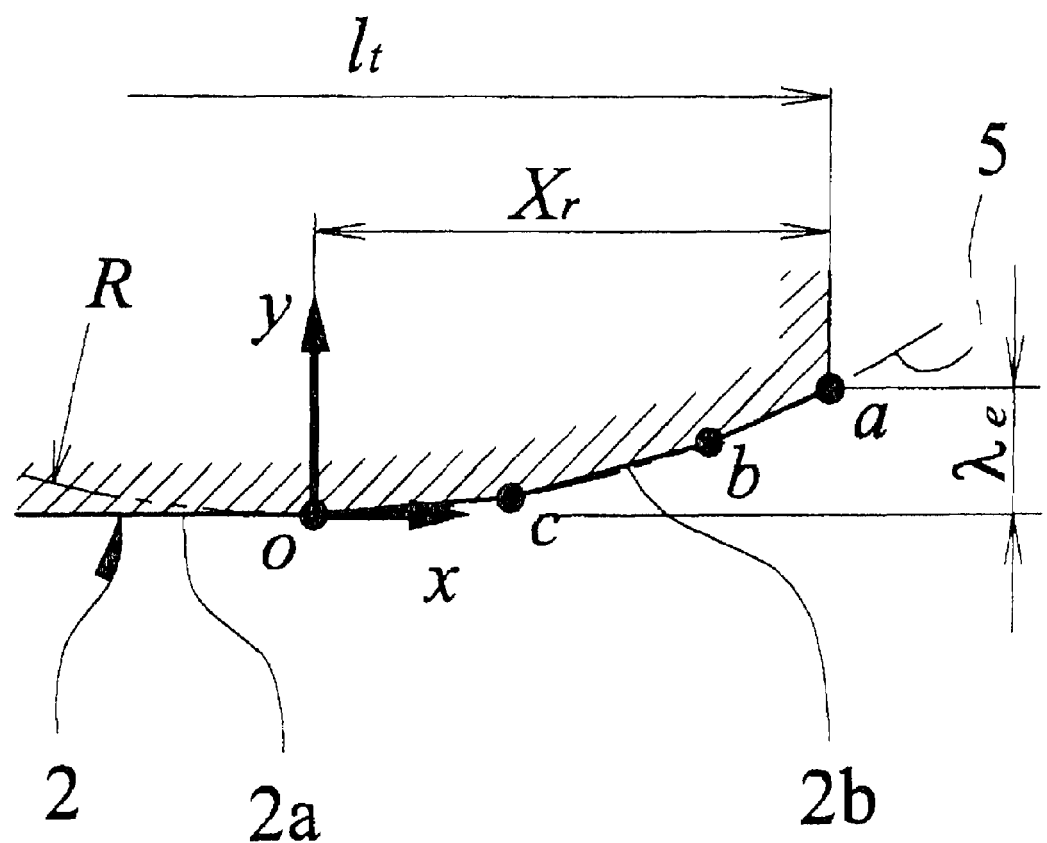

DESCRIPTION OF SYMBOLS 10 rolling machine element
11 guide block as an example of a first member
12 rail as an example of a second member
13 balls as an example of rolling members
14 raceway surface
14a crowning
15 oval shape
20 rolling machine element
21 guide block as an example of a first member
22 rail as an example of a second member
23 raceway surface
24a crowning

The invention claimed is:

1. A rolling machine element, comprising:
a first member formed with a raceway surface along which rolling members roll under a load; and
a second member to which said first member is attached through the rolling members to guide said first member to a predetermined direction,
wherein said rolling members are allowed to move in and out of said raceway surface in an orderly arranged state to allow said first member to move in a guiding direction of said second member,
wherein a crowning is formed at an end part of the raceway surface of said first member, the end part serving as an access point for said rolling members, said crowning having a shape defined by an edge of an oval in which a long axis and a short axis are different in length from each other.

2. The rolling machine element according to claim 1, wherein crowning relief amount of said crowning is ½ of the short axis of said oval.

3. A rolling machine element, comprising:
a first member formed with a raceway surface along which rolling members roll under a load; and
a second member to which said first member is attached through the rolling members to guide said first member to a predetermined direction,
wherein said rolling members are allowed to move in and out of said raceway surface in an orderly arranged state to allow said first member to move in a guiding direction of said second member,
wherein a polygonal crowning having a plurality of points as apexes and guiding the rolling members to roll under the load is formed at an end part of the raceway surface of said first member, the end part serving as an access point for said rolling members, said polygonal crowning being based on a shape defined by an edge of an oval in which a long axis and a short axis are different in length from each other.

4. The rolling machine element according to claim 3, wherein a crowning relief amount of said polygonal crowning is ½ of the short axis of said oval.

* * * * *